Feb. 17, 1959 S. MEURER 2,873,727
COMBUSTION CHAMBER FOR FUEL INJECTION
INTERNAL COMBUSTION ENGINE
Filed Sept. 16, 1957 2 Sheets-Sheet 1

INVENTOR
Siegfried Meurer
BY
Bailey, Stephens & Huettig
ATTORNEYS

Feb. 17, 1959  S. MEURER  2,873,727
COMBUSTION CHAMBER FOR FUEL INJECTION
INTERNAL COMBUSTION ENGINE
Filed Sept. 16, 1957   2 Sheets-Sheet 2

INVENTOR
Siegfried Meurer

BY
Bailey, Stephens & Huettig
ATTORNEYS

United States Patent Office 2,873,727
Patented Feb. 17, 1959

2,873,727

COMBUSTION CHAMBER FOR FUEL INJECTION INTERNAL COMBUSTION ENGINE

Siegfried Meurer, Nurnberg, Germany, assignor to Maschinenfabrik Augsburg-Nurnberg A. G., Nurnberg, Germany Application September 16, 1957, Serial No. 684,185

Claims priority, application Germany September 18, 1956

12 Claims. (Cl. 123—32)

This invention relates to a combustion chamber for a fuel injection internal combustion engine. In particular, the invention is directed to a non-self-supporting liner for a combustion chamber, which liner decreases the flow of heat out of the chamber. If the liner is not strong enough to withstand the gas pressure in the chamber, it is strongly pressed by the gas pressure against the wall of the chamber formed in either a piston or a cylinder head. Also, because of the thinness of the liner, little heat flow occurs along the liner.

The object of this invention is to produce a means for arranging the degree of heat insulation to different localized areas of the combustion chamber wall.

It is known to reduce the heat losses in the combustion chambers of fuel injection internal combustion engines by means of insulating the combustion chamber wall. Such insulation is composed either of ceramics or of metal. The metal liners are mounted so that a space of a bad heat conducting connection is made between the coolest portions of the body containing the chamber and the liner. In some cases, the liners are such that the gas pressure in the chamber is resisted by the liner itself, as, for example, the insulating space between the liner and the body containing the chamber is sealed against the entrance of the gases formed in the chamber. It is also known to provide a gas passage into the insulating space. In all these cases, it is difficult to maintain the temperatures of certain areas of the wall different from the temperatures of other wall areas, especially with respect to certain narrowly localized areas of different spaces.

In fuel injection internal combustion engines in which the fuel is applied as a thin film over a great area of the combustion chamber wall, and then removed from the wall by means of an air swirl and mixed with the air and burned, it is necessary to keep the wall of the chamber relatively cool so that the fuel applied to the wall will not be subject to a preliminary combustion. The taking up of the fuel in the form of vapor occurs partly because of the vaporization due to the wall temperature and partly due to the stream effect of the air or gas passing over the fuel film. Furthermore, the vaporization depends upon the thickness of the fuel film, and this thickness can be different over various wall areas. Therefore, the temperature ranges for the optimal vaporization of the fuel are different for certain areas of the combustion chamber wall. For example, the air swirl created for the removing of the fuel film, while rotating in its entirety about the combustion chamber axis at apparently the same angular velocity, actually has less velocity at the bottom of the combustion chamber. It is desirable, even though not necessary, to increase the wall temperature in this particular area in order to get a faster vaporization of the fuel while the essentially higher air velocity in the middle or equatorial region of the chamber produces a stronger cooling of such region.

Similar relations occur on the wall area of the chamber immediately adjacent the injection nozzle orifice and in the vicinity of the initial impact area of the fuel jet with the wall, respectively. Because the fuel from several fuel jets can form overlapping films, such films become too thick, and also because of the large quantity of fuel flowing over this area, it becomes too cool. Thus, it is desirable to increase the wall temperature in such areas. This invention provides a simple means for creating an increase in wall temperature over a limited area of the combustion chamber. Insulating members composed of metal or other material for decreasing the transfer of heat are applied to local areas of the combustion chamber wall at which places the wall temperature should be higher than that of adjacent wall areas. These members are disc or cup shaped and can be applied either to the inner or outer sides of the combustion chamber liner. When applied to the outside of the liner, the discs are positioned between the liner and the surrounding body which forms either the piston or cylinder head. The member can be composed of, for example, thin sheet metal discs or sheet metal cups having an annular circumference shaped to the size of the particular local wall area. If the liner is cast into the body and the insulating member is positioned on the outside of the liner, a special recess is provided in the body for holding the insulating member. Cup-shaped members can be used on the inside as well as on the outside of the liner while disc-shaped members can be applied only to the inside of the liner. In the latter case, the insulating member extends as a chord over the liner and thus forms a limited space which increases the insulating effect. When cup-shaped members are used on the outside of the liner, either a tight fit with the liner or a space between the member and the liner can be achieved by selecting the radius of curvature of the member with respect to that of the liner. In certain cases, the hollow insulating space can be put into communication with the interior of the combustion chamber by means of bores or passageways. The axes of these bores can be directed either radially toward the center of the combustion chamber or tangentially toward the surface of the liner forming the wall of the combustion chamber and in the direction of the air swirl. Thus, it is possible for small amounts of fuel to enter the hollow space and be subject to partial combustion. Such partial combustion will increase the local turbulence which is advantageous for such areas which have a weak air movement.

The features of this invention can also be employed for combustion chambers which do not have a heat insulating liner.

The means by which the object of the invention is obtained are disclosed more fully with reference to the accompanying drawings, in which.

Figure 1:
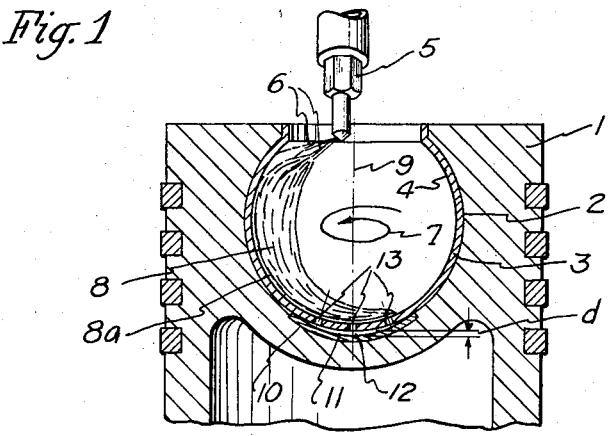
Figure 1 is a cross-sectional view through a piston having a liner in a combustion chamber.

The example shown in the drawings is a combustion chamber formed in the body of a piston. However, the combustion chamber can also be formed in the body of a cylinder head.

The piston 1 contains a combustion chamber 2. This chamber can be of a hemispherical shape, but in the drawing is shown as a sphere open at its upper end. A heat insulating liner 3 composed of thin sheet metal, for example, is inserted in the chamber. The inner wall 4 of the liner facing the interior of the chamber constitutes a surface upon which the fuel is applied.

Liner 3 does not have the structure of a freely fitted or a self-supporting liner by means of which it could resist the gas pressures occurring in the chamber. The liner, theerfore, under the gas pressure is forced into close contact with the wall of chamber 2 and thus is supported by the body of the piston. Liner 3 can be directly cast into the body of the piston. From injection nozzle 5, one or more fuel jets 6 are directed against the inner surface of liner 3. These jets are directed onto the inner wall 4 of liner 3 in such a manner that a film of fuel is formed extending in the direction of the arrow indicated air stream 7 with the film being spread over the bottom of the chamber. The area covered by the film is indicated by the shaded portion 8, and the film has a thickness 8a. The air swirls in the combustion chamber about axis 9. On the bottom of the combustion chamber within the range of axis 9, the liner is partly separated from the body of piston 1 by a recess 10. An insulating member 11 composed of sheet metal or low heat conductive material is inserted in recess 10. Member 11 is cup shaped and has a circumference of a size to enclose the circumference of the wall area to be given a localized temperature. The circumference of member 11 can be circular or of other shape. As shown in Figure 1, member 11 is arched in section and has a radius of curvature smaller than that of liner 3. Therefore, the center of member 11 is separated from liner 3 by a distance d, while at the same time its circumferential edge contacts liner 3. The hollow space 12 thus formed increases the insulating effect over this area. According to the degree of arch for member 11, space 12 can be increased, decreased, or eliminated. In the latter case, member 11 would be in full contact with liner 3 and is not illustrated in the drawing.

Figure 2:
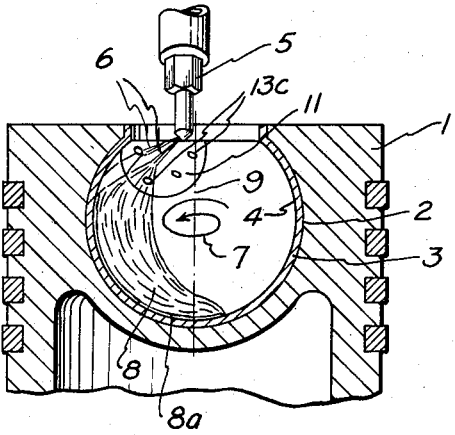
Figure 2 is a similar view of a modified form of the invention.

In Figure 2, the insulating member 11 is positioned near the injection nozzle 5.

Figure 3:
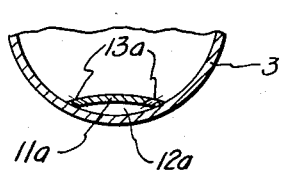
Figure 3 is a cross-sectional view of a portion of a liner with an insulated member fitted therein.
Figure 4:
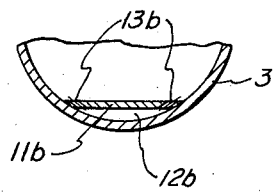
Figure 4 is a similar view of a modification.

In Figures 3 and 4, the insulating member 11a or 11b is fitted on the inside of liner 3, and is either cup shaped, as in Figure 3, or straight, as in Figure 4. Hollow spaces 12a and 12b, respectively, are also formed in this structure. When a cup-shaped insulating member 11a is used, as in Figure 3, and is arched opposite to the curvature of liner 3, the hollow space 12a is enlarged, which is desired in many cases. If the hollow spaces 12a and 12b communicate with the interior of the combustion chamber by means of bores or passageways 13, 13a or 13b which are positioned either in the liner 3 or in the insulating member 11a or 11b, a small portion of the fuel can enter the hollow spaces and when partly burned creates a blowing effect which accelerates the gas and air flow in this area. Bores 13, 13a, 13b can be directed either radially toward the center of the combustion chamber, as shown in Figure 1, or tangentially toward the wall of the liner 3 in the direction of the air swirl, as shown in Figures 3 and 4. The use of bores 13c is similarly shown in Figure 2.

Figure 5:
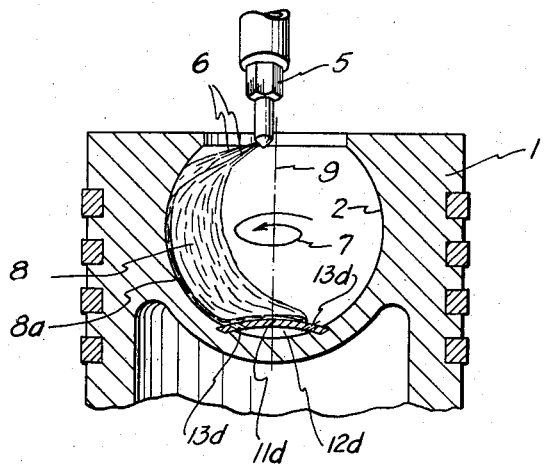
Figure 5 is a cross-sectional view through a piston showing a further modification.

In Figure 5, the combustion chamber 2 does not have a liner 3. In this modification, the invention is advantageously used, if on the bottom of the combustion chamber, for example, a localized insulating member 11d similar to member 11a in Figure 3 is mounted directly on wall 2 of piston 1. An insulating hollow space 12d is produced by appropriately shaping member 11d, which space communicates with the interior of the combustion chamber by means of bores 13d.

The following effects are produced by means of the invention.

Because of the insulating members 11, the rate of heat flowing into the piston body is reduced in local areas. Thus, less heat is transferred through the areas covered by members 11 than in the remaining wall areas. This produces a localized increase in wall temperature.

The invention is not limited to the applications disclosed herein. The invention can be used in a reversed form in which members having a good heat conductivity can be used over areas where it is desired to have a good transfer of heat, such members consisting, for example, of copper instead of poor heat conductive members. In this case, the members must be in full close contact with the body of the piston or cylinder head or liner.

Having now described the means by which the object of the invention is obtained,

I claim:

1. In combination with the combustion chamber for a fuel injection internal combustion engine in which the major portion of the fuel is deposited as a film on the wall of said chamber, then vaporized and mixed with an air swirl, and said chamber having a heat throttling liner supported by the wall of the combustion chamber against the pressure of the combustion gases, comprising a member positioned adjacent said liner over a limited localized area of said liner where the temperature of the localized area is to be maintained higher than that of the remainder of the liner.

2. In the combination of claim 1, said member being circular and having at least its circumferential edge in contact with said liner.

3. In the combination of claim 1, said member being cup-shaped and of the same approximate curvature as said liner.

4. In the combination of claim 1, said member being of less curvature than said liner and positioned between the liner and combustion chamber wall with a space between a portion of said member and said wall.

5. In the combination of claim 1, said member being a disc mounted on the exposed surface of said liner with a space therebetween.

6. In the combination of claim 1, said member being cup-shaped with the peripheral edge of said member resting on the oppositely curved surface of said liner.

7. In the combination of claim 1, said member being circular and having only its circumferential portion in contact with said liner to form a space therebetween, and passageways between said space and the interior of said combustion chamber.

8. In the combination of claim 7, said passageways being directed toward the center of said combustion chamber.

9. In the combination of claim 7, said passageways being directed tangentially of the combustion chamber wall.

10. In an internal combustion self-ignition engine having cylinder and piston structures constructed and arranged to provide a combustion chamber, means for creating swirling air movement in said chamber, nozzle means for injecting fuel to form a film on the wall of said chamber in the path of the air movement, the improvement comprising a high heat conductive liner inserted in said chamber, and a low heat conductive member covering a limited localized area of the wall of said chamber in at least part of the area covered by the film of fuel.

11. In an internal combustion engine as in claim 10, said member being positioned in said chamber opposite said nozzle means.

12. In an internal combustion engine as in claim 10, said member being positioned adjacent said nozzle means in the impact area of fuel injected by said nozzle means.

References Cited in the file of this patent

UNITED STATES PATENTS 1,798,260    Hehr _____ Mar. 31, 1931

FOREIGN PATENTS 404,030    Great Britain _____ Jan. 8, 1934
665,507    Germany _____ Sept. 28, 1938
678,446    Germany _____ July 15, 1939